(12) United States Patent
Yoon

(10) Patent No.: US 11,409,997 B2
(45) Date of Patent: Aug. 9, 2022

(54) ARTIFICIAL INTELLIGENCE SERVER

(71) Applicant: LG ELECTRONICS INC., Seoul (KR)

(72) Inventor: Esther Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 315 days.

(21) Appl. No.: 16/577,840

(22) Filed: Sep. 20, 2019

(65) Prior Publication Data

US 2021/0049422 A1 Feb. 18, 2021

(30) Foreign Application Priority Data

Aug. 16, 2019 (KR) .................. 10-2019-0100589

(51) Int. Cl.
*G06K 9/62* (2022.01)
*G06N 3/04* (2006.01)
*G06N 3/08* (2006.01)

(52) U.S. Cl.
CPC ......... *G06K 9/6267* (2013.01); *G06K 9/6256* (2013.01); *G06K 9/6262* (2013.01); *G06N 3/04* (2013.01); *G06N 3/08* (2013.01)

(58) Field of Classification Search
CPC .. G06K 9/6267; G06K 9/6256; G06K 9/6262; G06K 9/6269; G06K 9/00771; G06K 9/00671; G06K 9/2018; G06K 2209/17; G06N 3/04–08; G06N 3/0454; G06N 3/084; G06F 16/783; G06F 16/953; G06F 16/285; G06F 16/9535; G06Q 50/10–12; G06T 2207/30128; G06T 2207/20084; G06T 7/0004

See application file for complete search history.

(56) References Cited

U.S. PATENT DOCUMENTS

| | | | |
|---|---|---|---|
| 9,589,341 B2* | 3/2017 | Sato | G06T 7/0004 |
| 9,659,225 B2* | 5/2017 | Joshi | G06Q 50/12 |
| 10,839,151 B2* | 11/2020 | Rapaport | G06F 3/04812 |
| 10,846,778 B2* | 11/2020 | Argue | G06Q 30/0633 |
| 2010/0111383 A1* | 5/2010 | Boushey | G06K 9/78 382/128 |
| 2010/0292998 A1* | 11/2010 | Bodlaender | G16H 20/60 705/2 |
| 2011/0055044 A1* | 3/2011 | Wiedl | G06Q 30/0621 705/26.5 |
| 2012/0136864 A1* | 5/2012 | Ochtel | G06Q 30/0633 707/738 |
| 2012/0317505 A1* | 12/2012 | Schwartz | G06Q 30/0633 715/764 |
| 2013/0058566 A1* | 3/2013 | Sato | G06K 9/4642 382/159 |

(Continued)

*Primary Examiner* — Michael S Osinski
(74) *Attorney, Agent, or Firm* — Birch, Stewart, Kolasch & Birch, LLP

(57) ABSTRACT

Disclosed is an artificial intelligence server. The artificial intelligence server includes a communication unit in communication with an electronic device, a memory for storing data, and a processor configured to receive an image of ingredients from the electronic device, provide the image of the ingredients to an artificial intelligence model to obtain a food name corresponding to the image of the ingredients, and transmit a recipe corresponding to the food name to the electronic device.

13 Claims, 16 Drawing Sheets

(56) References Cited

U.S. PATENT DOCUMENTS

| | | | | |
|---|---|---|---|---|
| 2014/0095479 | A1* | 4/2014 | Chang | G06F 16/335 |
| | | | | 707/722 |
| 2015/0056344 | A1* | 2/2015 | Luckhardt | F24C 7/081 |
| | | | | 426/233 |
| 2015/0170001 | A1* | 6/2015 | Rabinovich | G06K 9/6267 |
| | | | | 382/110 |
| 2016/0110423 | A1* | 4/2016 | Uchida | G06F 16/248 |
| | | | | 707/771 |
| 2017/0148162 | A1* | 5/2017 | Kang | G06T 7/0012 |
| 2018/0211139 | A1* | 7/2018 | Bui Tran | G06K 9/00 |
| 2018/0292092 | A1* | 10/2018 | Bhogal | A23L 5/17 |
| 2019/0034556 | A1* | 1/2019 | Gu | G06K 9/628 |
| 2019/0130005 | A1* | 5/2019 | Byron | G06F 16/24575 |
| 2019/0139444 | A1* | 5/2019 | LeeKong | G09B 19/0092 |
| 2019/0200797 | A1* | 7/2019 | Diao | F24C 7/082 |
| 2019/0213443 | A1* | 7/2019 | Cunningham | G06K 9/78 |
| 2019/0228855 | A1* | 7/2019 | Leiter | G06N 3/084 |
| 2019/0384990 | A1* | 12/2019 | Kim | G06K 9/54 |
| 2020/0042816 | A1* | 2/2020 | Gatto | H04N 5/23299 |
| 2020/0068265 | A1* | 2/2020 | Pinel | G10L 15/26 |
| 2020/0088463 | A1* | 3/2020 | Jeong | G06F 3/167 |
| 2020/0117954 | A1* | 4/2020 | Jiang | G06K 9/22 |
| 2020/0151555 | A1* | 5/2020 | Kozhaya | G06N 3/08 |
| 2020/0293781 | A1* | 9/2020 | Xiong | G06N 3/08 |
| 2020/0351557 | A1* | 11/2020 | Drake | G06N 20/00 |
| 2021/0030199 | A1* | 2/2021 | Olson | G06T 7/70 |
| 2021/0043108 | A1* | 2/2021 | Baumback | G06Q 50/12 |
| 2021/0044871 | A1* | 2/2021 | Yang | H04N 21/472 |
| 2021/0204553 | A1* | 7/2021 | Mehta | G06K 9/6269 |
| 2021/0212257 | A1* | 7/2021 | Zhang | A01D 45/00 |
| 2021/0228022 | A1* | 7/2021 | Liu | A47J 37/041 |
| 2021/0265036 | A1* | 8/2021 | Lynn | G16H 20/60 |
| 2021/0279855 | A1* | 9/2021 | Shangin | G06K 9/00711 |
| 2021/0365732 | A1* | 11/2021 | Lin | G06K 9/32 |

\* cited by examiner

FIG. 11

| | INGREDIENT | TYPE OF COOKING DEVICE | MODEL NAME | COOKING METHOD | CONTROL INFORMATION | INITIAL STATE | FINISHED STATE | FOOD CATEGORY | FOOD NAME | POPULARITY | NUMBER OF REGISTRATIONS |
|---|---|---|---|---|---|---|---|---|---|---|---|
| (a) | RAW CHICKEN ONION GARLIC | OVEN | MLB310T | MLB310T | 220 DEGREES 90 MINUTES |  |  | STEAM | STEAMED CHICKEN | 90 POINTS | 16 TIMES |
| (b) | RAW CHICKEN POTATO SWEET POTATO | OVEN | MLB2501 | FLIP INGREDIENTS 20 MINUTES AFTER START OF COOKING | 220 DEGREES 60 MINUTES ROAST |  |  | ROAST | CHICKEN | 89 POINTS | 3 TIMES |
| (c) | FLOUR DOUGH | MICROWAVE | PBS2638 | KNEAD FLOUR WITH HOT WATER | 180 DEGREES 20 MINUTES | | | | | | |

FIG. 12
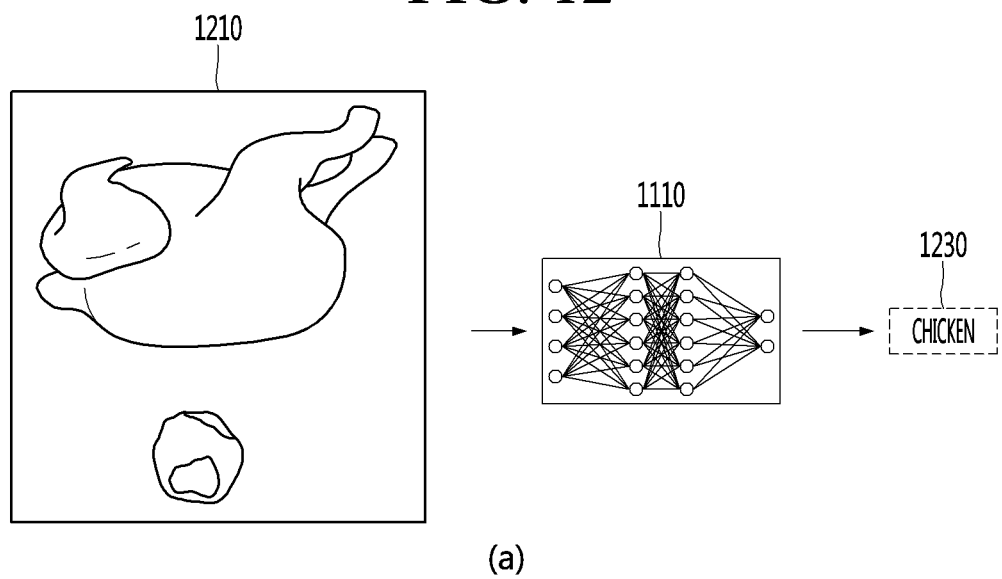
(a)
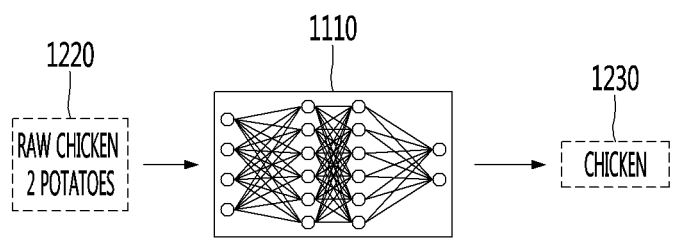
(b)

ARTIFICIAL INTELLIGENCE SERVER

CROSS-REFERENCE TO RELATED APPLICATIONS

This application claims priority to Korean Patent Application No. 10-2019-0100589 filed on Aug. 16, 2019 in Korea, the entire contents of which is hereby incorporated by reference in its entirety.

BACKGROUND

The present invention relates to an artificial intelligence cooking device that may receive an image of ingredients from a user, search for recipes of other users using the image of the ingredients, and provide a recipe for a food the user wants to make.

Artificial intelligence, which means that computers may imitate a human intelligence, is a field of computer engineering and information technology that studies a method for allowing the computers to think, learn, self-develop, and the like that may be performed by the human intelligence.

Further, the artificial intelligence does not exist by itself, but directly or indirectly related to other fields of the computer science. Particularly in the modern age, attempts to introduce artificial intelligence elements in various fields of the information technology and to utilize the artificial intelligence elements in solving problems in the field are being actively carried out.

In an example, a technology that uses the artificial intelligence to recognize and learn an ambient situation, provides information desired by a user in a desired form, or performs an operation or a function desired by the user is being actively researched.

Further, an electronic device providing such various operations and functions may be referred to as an artificial intelligence device.

In an example, recently, people sharing recipes via Internet, social network services/sites (SNS), or the like and cooking using the shared recipes are increasing.

However, because of complicate processes of creating and uploading recipes and searching and downloading recipes that are suitable for oneself, sharing recipes and utilizing the shared recipes are currently limited.

SUMMARY

The present invention is to solve the above problem. A purpose of the present invention is to provide an artificial intelligence cooking device that may receive an image of ingredients from a user, search for recipes of other users using the image of the ingredients, and provide a recipe for a food the user wants to make.

In an aspect of the present invention, there is provided an artificial intelligence server including a communication unit in communication with an electronic device, a memory for storing data, and a processor configured to receive an image of ingredients from the electronic device, provide the image of the ingredients to an artificial intelligence model to obtain a food name corresponding to the image of the ingredients, and transmit a recipe corresponding to the food name to the electronic device.

According to the present invention, recipes actually used by customers may be stored as big data on a server and customized recipes may be provided to customers who need recipes.

Further, according to the present invention, when a user provides only the image of the ingredients to the artificial intelligence server, the user may be provided with a customized recipe. Especially when the electronic device is an artificial intelligence cooking device, the user may be provided with a customized recipe merely by injecting ingredients into a cooking chamber.

Further, according to the present invention, since the food name is predicted using the artificial intelligence model trained based on the big data, a food the user wants to produce using the ingredients may be predicted exactly.

Further, according to the present invention, since a recipe is recommended based on a type, model, and a specification of the cooking device, a recipe the most suitable for the cooking device used by the user may be recommended.

Further, according to the present invention, since whether a food is finished is determined by comparing an image of the food being cooked with a final food product image, the food may be finished while correcting a difference between a cooking environment of the recipe and an actual cooking environment.

BRIEF DESCRIPTION OF THE DRAWINGS

FIG. 11 is a diagram for illustrating a database according to an embodiment of the present invention.

FIG. 12 is a diagram for illustrating a method for training an artificial intelligence model according to an embodiment of the present invention.

DETAILED DESCRIPTION OF THE PREFERRED EMBODIMENTS

Figure 1:
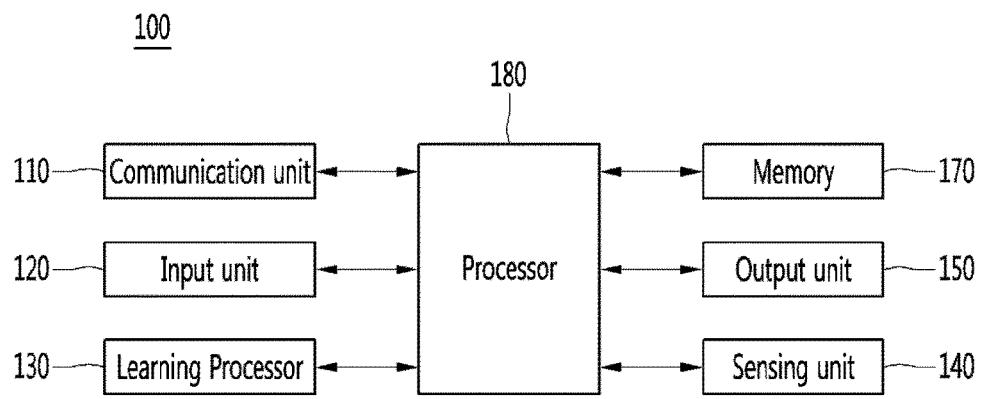
FIG. 1 illustrates an AI device 100 according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.).

It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR).

The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting an image signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
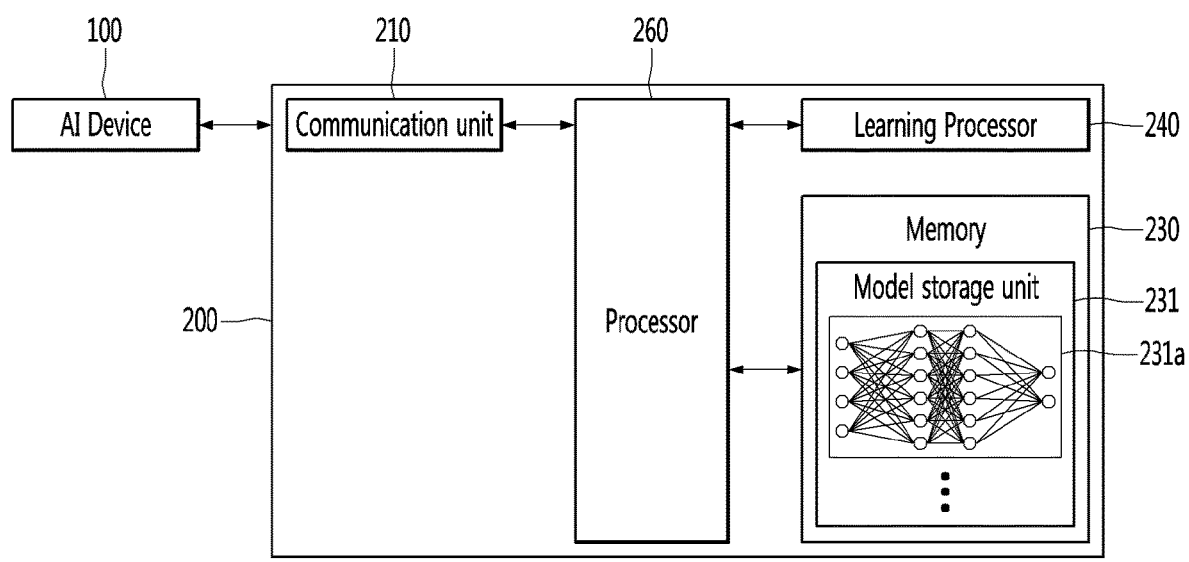
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
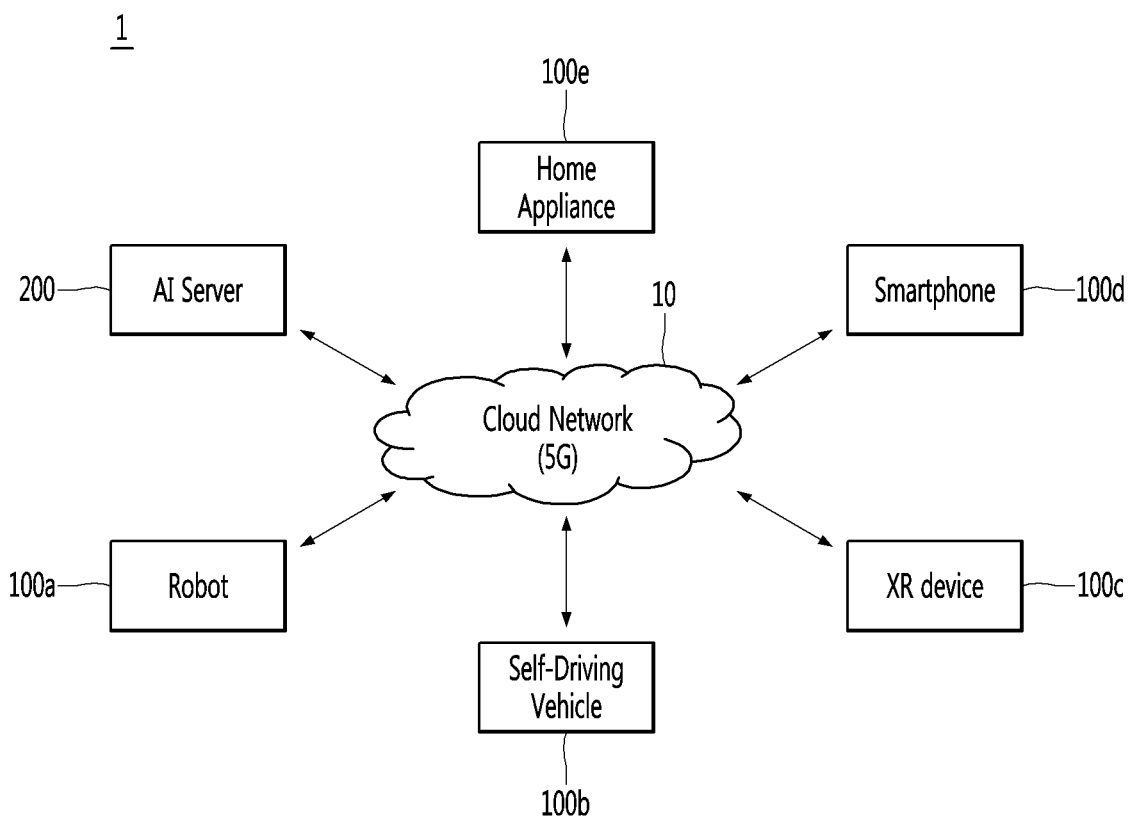
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along, the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
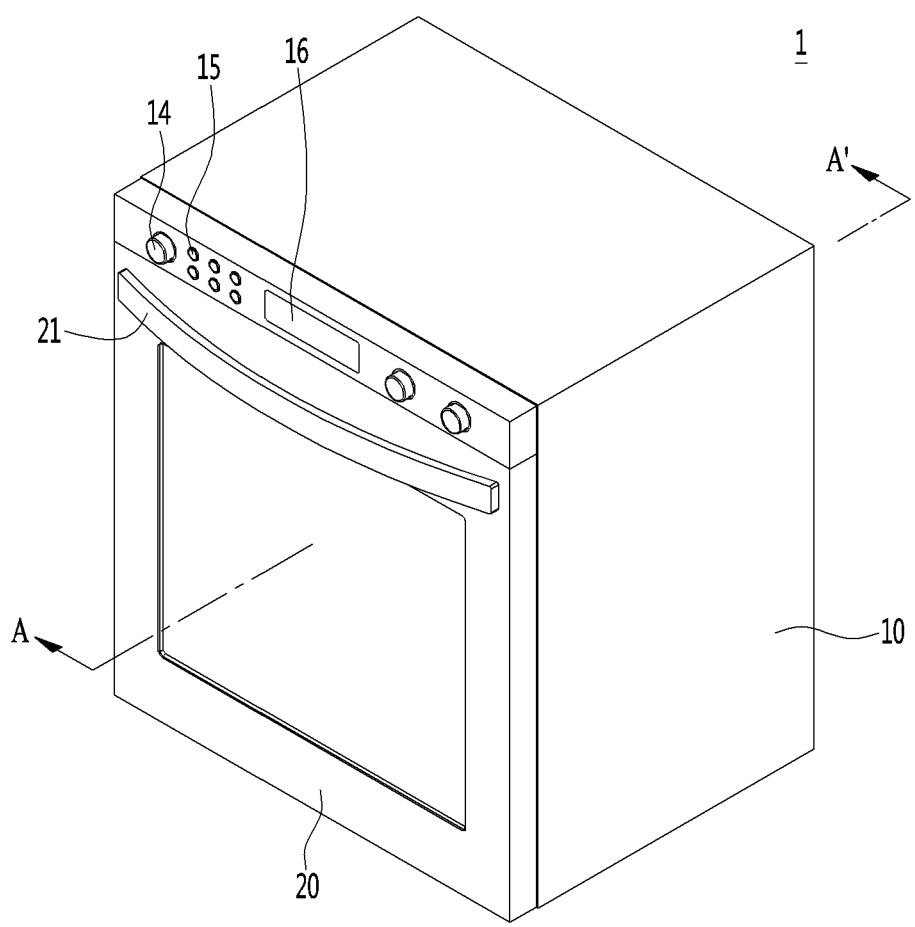
FIGS. 4 to 6 illustrate a cooking device according to an embodiment of the present invention.
Figure 5:
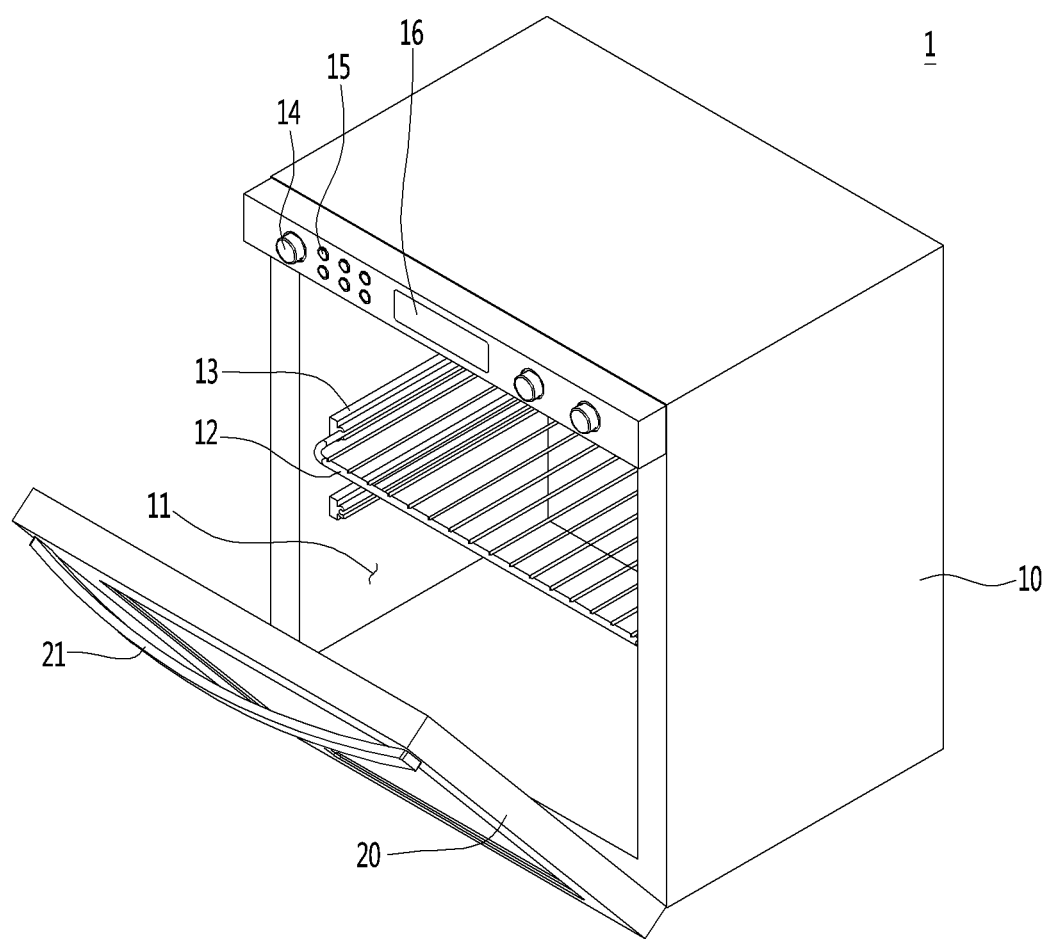
Figure 6:
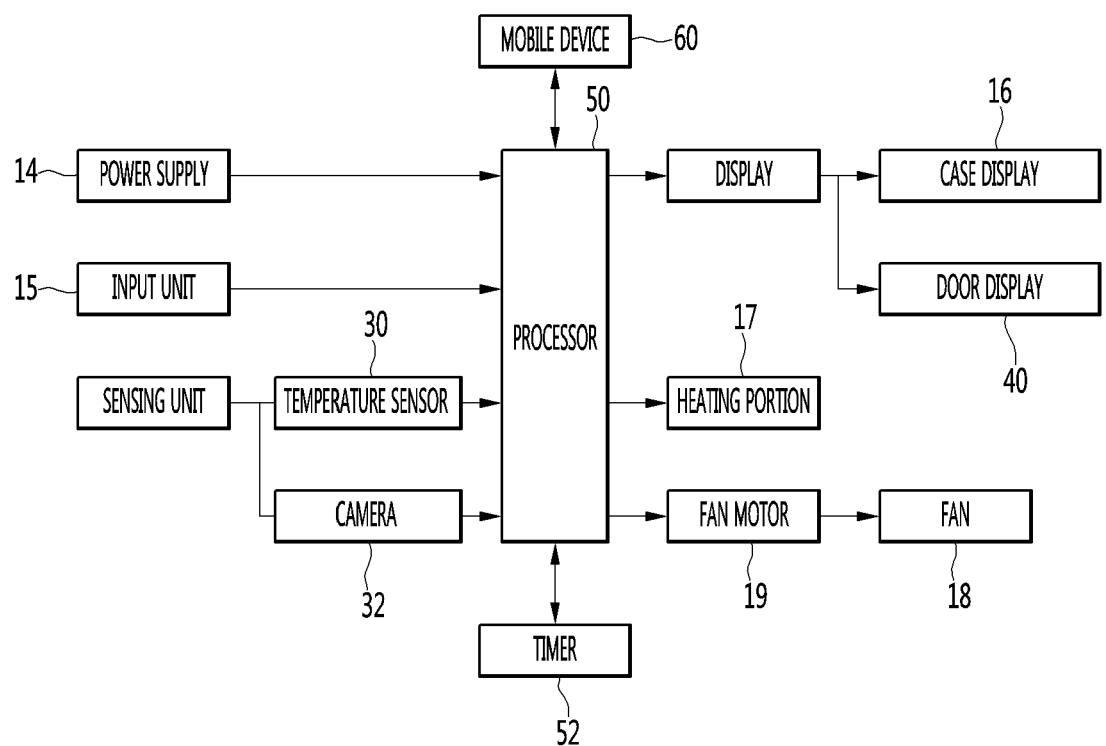

FIGS. 4 to 6 are views for illustrating an artificial intelligence cooking device according to an embodiment of the present invention.

Hereinafter, the artificial intelligence cooking device will be described with an example of an oven.

In general, an oven is an appliance that heats and cooks food disposed in a predetermined space. The oven may be classified into an electric-type, a gas-type, an electronic-type, and the like based on a heat source thereof. For example, the electric oven uses an electric heater as the heat source, the gas oven uses a heat from gas as the heat source, and the electronic oven (microwave oven) uses a heat of friction of water molecules due to high frequency as the heat source.

FIG. 4 is a view illustrating an oven according to an embodiment of the present invention and FIG. 5 illustrates opening of a door of an oven according to an embodiment of the present invention.

As shown in FIGS. 4 to 5, an oven 1 according to the present invention includes a case 10 forming an outer surface of the oven 1 and a door 20 attached to one face of the case 10.

The case 10 is provided in a shape having an inner space therein, and a front face thereof is opened. The case 10 may be in a predetermined box shape, and may include a power supply 14, an input unit 15, and a display 16 on an outer face thereof.

The power supply 14 is provided in various shapes such that the user may turn on/off the oven 1. Further, the input unit 15 is provided with a plurality of buttons such that the user may select various modes, temperatures, and times.

The display 16 may be understood as a component that visualizes predetermined information such that the user may determine a state of the oven 1. In particular, the display 16 may be turned on/off with the power supply 14 and may be provided in a predetermined panel form. Such display 16 will be described below in detail.

A cooking chamber 11 for accommodating food therein is defined in the case 10. A grill 12 for placing the food thereon may be provided in the cooking chamber 11. Further, a grill mounting portion 13 may be provided on an inner wall of the cooking chamber 11 such that the grill 12 is detachably installed. The grill 12 and the grill mounting portion 13 may be provided in various numbers and shapes.

Further, a heating portion 17, a fan 18, and a fan motor 19 for providing a driving force to the fan 18 are disposed inside the case 10 and outside the cooking chamber 11. It is understood that the heating portion 17 is a component that heats inside the cooking chamber 11 and the fan 18 is a component for flowing air inside the cooking chamber 11.

The heating portion 17 may be provided as an electric heater that dissipates a heat by electricity input, and may be installed at one side of the case 10. Further, the heating portion 17 may be installed at one side of the fan 18 to be integrally formed with the fan 18. The fan 18 receives the driving force from the fan motor 19 to flow air heated by the heating portion 17 in the cooking chamber 11.

That is, the heating portion 17 and the fan 18 are understood as components for cooking the food in the cooking chamber 11, and shapes thereof shown in the drawings are merely illustrative and may be various. Further, the oven 1 according to the present invention is not limited to the electric oven using electricity as the heat source. Further, the oven 1 may be the gas oven, the electronic oven, or the like that cooks the food using various heat sources.

The door 20 is disposed on the open front face of the case 10 to open and close the cooking chamber 11. That is, the cooking chamber 11 may be opened and closed by the door 20. For convenience of description, a configuration of an installation structure, a locking device, or the like of the door 20 is omitted.

As shown in FIG. 5, the door 20 is installed on the front face of the case 10 to be capable of pivoting forward. Further, the door 20 may be provided with a handle 21 that may be gripped and pivoted by the user. Further, the oven 1 according to the present invention may include a predetermined sensing unit for sensing an internal state of the cooking chamber 11.

The sensing unit may include a camera 32 that may capture the inside of the cooking chamber 11. The camera 32 may be disposed on one side of the cooking chamber 11 to provide an image inside the cooking chamber 11.

FIG. 6 illustrates a control configuration of an oven according to an embodiment of the present invention.

The oven 1 according to the present invention includes a processor 50 for controlling the components.

The user may use the power supply 14 and the input unit 15 to deliver a predetermined command to the processor 50. In this connection, the power supply 14 and the input unit 15 may be provided on the outer surface of the case 11 as described above, or may be provided on a mobile device 60 of the user.

For example, the processor 50 and the mobile device 60 may be connected with each other via Bluetooth or the like to exchange predetermined information. That is, the user may input a command for controlling the oven 1 at a long distance. For example, the user may preheat the oven 1 using the mobile device 60 and then approach the oven 1 to inject the food after the preheating is completed.

Further, the processor 50 may receive information sensed by the predetermined sensing unit. The sensing unit may include the above-mentioned camera 32 and a temperature sensor 30 for measuring a temperature inside the cooking chamber 11. In detail, the camera 32 may capture the inside of the cooking chamber 11 and transmit the generated image to the processor 50 and the temperature sensor 30 may transmit temperature information of inside of the cooking chamber 11 to the processor 50.

Further, the processor 50 may be provided with a timer 52 for measuring a predetermined time. For example, the processor 50 may transmit a command to the timer 52 to measure a cooking time when the cooking is started or to turn on the oven 1 based on a reservation time.

The processor 50 may operate the heating portion 17 and supply power to the fan motor 19 to drive the fan 18.

Further, the processor 50 may transmit predetermined information to the display or the mobile device 60 for visualization. For example, the temperature transmitted from the temperature sensor 30 and the cooking time measured by the timer 52 may be visualized.

The display includes the case display 16 described above and a door display 40. The processor 50 may visualize information on at least one of the case display 16, the door display 40, and the mobile device 60.

In an example, the artificial intelligence cooking device has been described with an example of the oven, but is not limited thereto.

For example, the artificial intelligence cooking device described in the present invention may be applied to any product capable of setting cooking temperature or cooking time and heating ingredients to perform the cooking, such as a gas stove, an electric stove, a microwave oven, an induction, a hybrid, a highlight, and the like.

In an example, an artificial intelligence server described in the present invention may include some or all of the components of the AI device 100 described in FIG. 1 and may perform the function performed by the AI device 100. Further, the term AI device 100 may be used interchangeably with the term artificial intelligence server 100.

In an example, the electronic device described in the present invention may include some or all of the components of the AI device 100 described in FIG. 1 and may perform the function performed by the AI device 100. Further, the electronic device may be an artificial intelligence cooking device or a mobile terminal.

In an example, the artificial intelligence cooking device may include some or all of the components of the AI device 100 described in FIG. 1 and may perform the function performed by the AI device 100.

Figure 7:
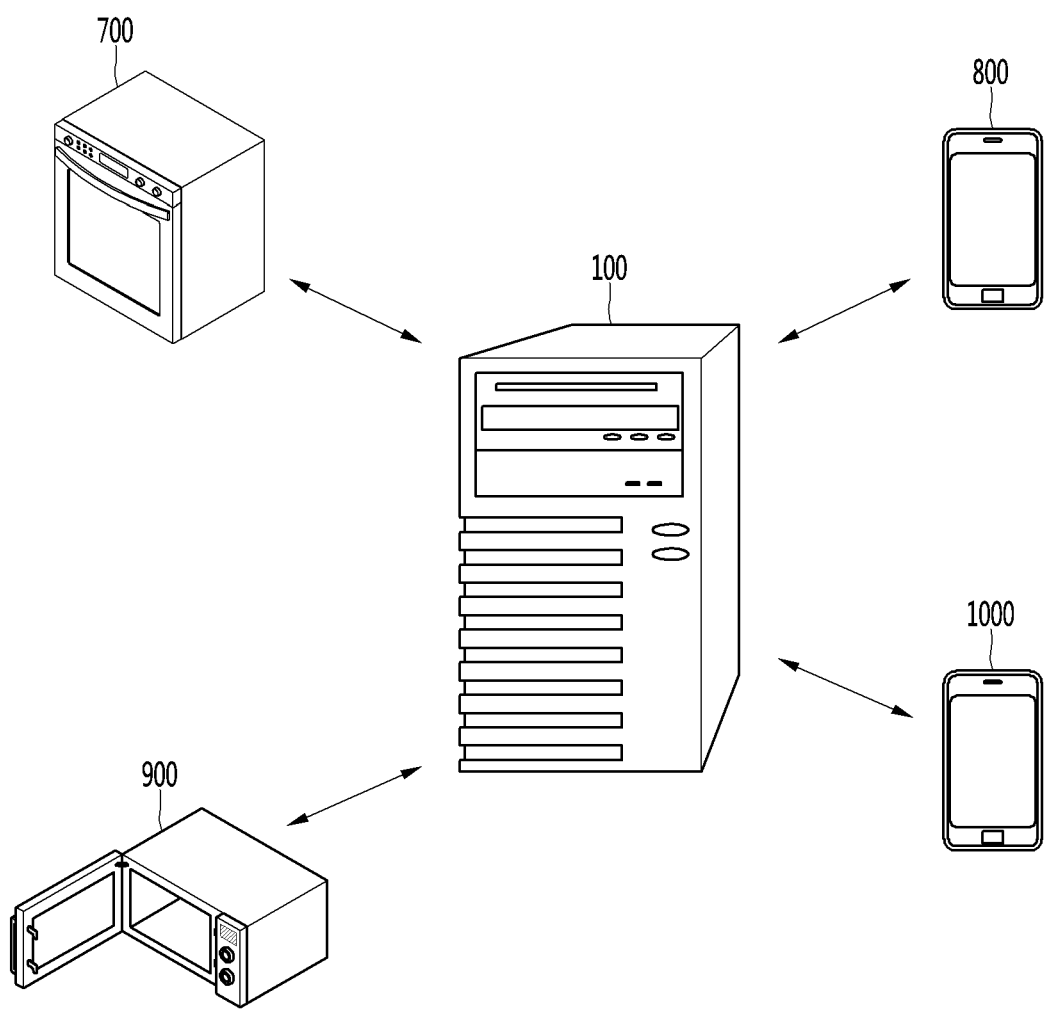
FIG. 7 illustrates a recipe sharing system according to an embodiment of the present invention.

FIG. 7 illustrates a recipe sharing system according to an embodiment of the present invention.

A recipe sharing system 10 according to an embodiment of the present invention may include a plurality of electronic devices 700, 800, 900, and 1000 and an artificial intelligence server 100.

The artificial intelligence server 100 may communicate with the plurality of electronic devices 700, 800, 900, and 1000 via a communication unit. In this connection, the plurality of electronic devices 700, 800, 900, and 1000 may be a plurality of electronic devices respectively corresponding to a plurality of users.

Further, the plurality of electronic devices 700, 800, 900, and 1000 may be a cooking device or a mobile terminal.

Further, the artificial intelligence server 100 may receive and store an image of ingredients and a recipe from the plurality of electronic devices 700, 800, 900, and 1000.

Further, the artificial intelligence server 100 may receive the image of the ingredients from the plurality of electronic devices 700, 800, 900, and 1000, and transmit a recipe corresponding to the image of the ingredients to the plurality of electronic devices 700, 800, 900, and 1000.

Figure 8:
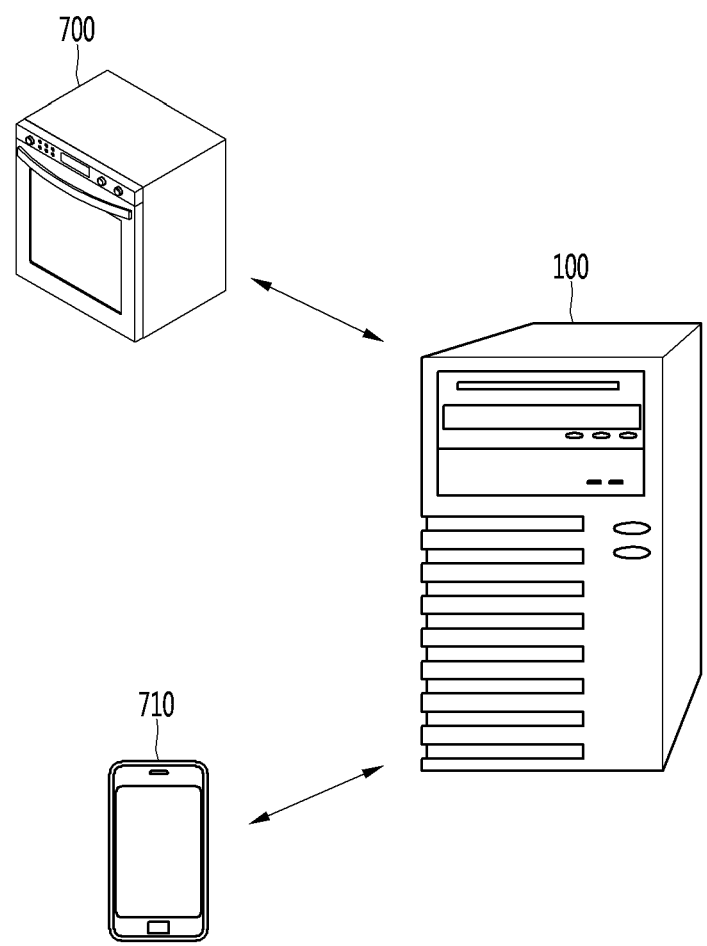
FIG. 8 is a diagram for illustrating a remote control system according to an embodiment of the present invention.

FIG. 8 is a diagram for illustrating a remote control system according to an embodiment of the present invention.

The remote control system may include an artificial intelligence cooking device 700, an artificial intelligence server 100, and a mobile terminal 710.

In this connection, a user of the artificial intelligence cooking device 700 and a user of the mobile terminal 710 may be the same. Further, the artificial intelligence server 100 may communicate with the artificial intelligence cooking device 700 and the mobile terminal 710.

The mobile terminal 710 may receive control information from the user and transmit the control information to the artificial intelligence server 100. In an example, when the control information is received, the artificial intelligence server 100 may transmit a control information or a control command corresponding to the control information to the artificial intelligence cooking device 700. In this case, the artificial intelligence cooking device 700 may perform cooking based on the control information or the control command.

In an example, the remote control system is only one embodiment of the present invention. Therefore, the operation of the recipe sharing system is not limited to the operation of the remote control system described in FIG. 8.

Figure 9:
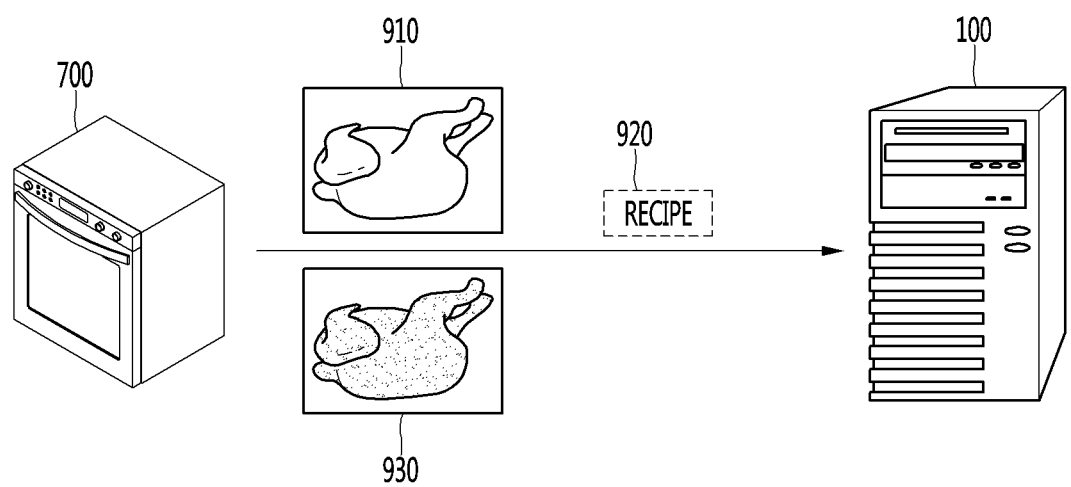
FIGS. 9 to 10 illustrate a method for obtaining an image of ingredients, a recipe, and other additional information from a plurality of electronic devices according to an embodiment of the present invention.
Figure 10:
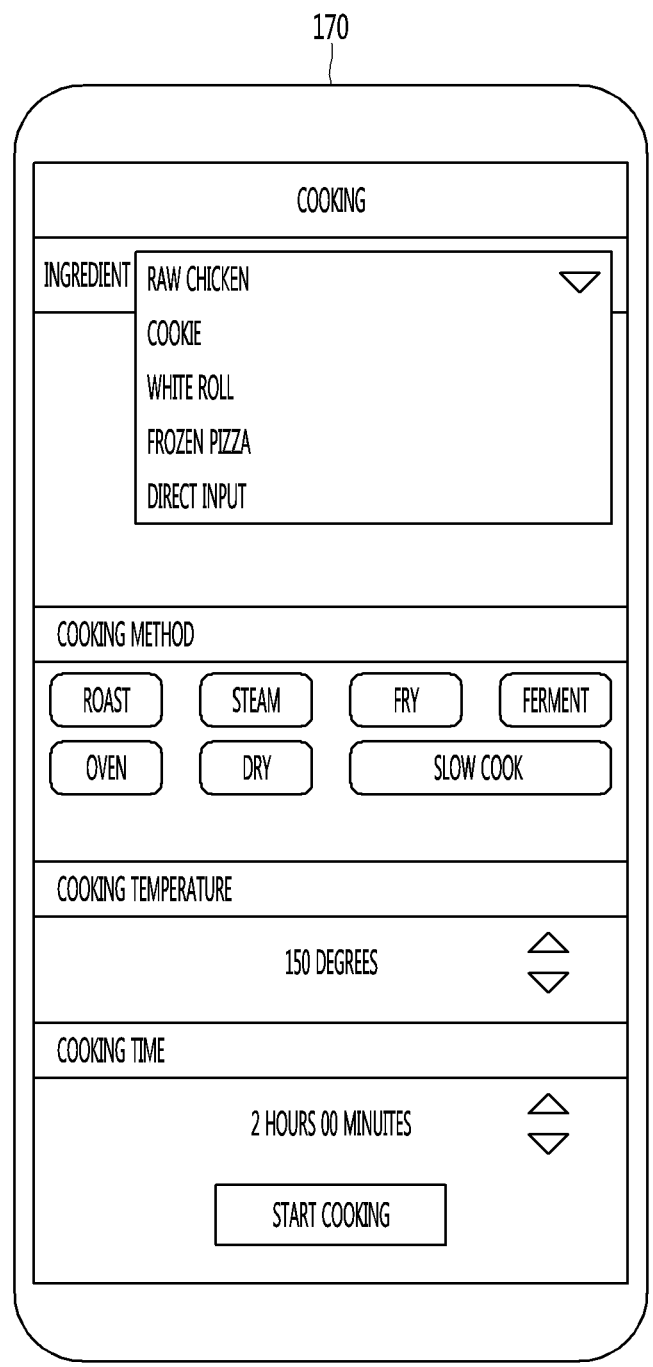

FIGS. 9 to 10 illustrate a method for obtaining an image of ingredients, a recipe, and other additional information from a plurality of electronic devices according to an embodiment of the present invention.

Referring to FIG. 9, the processor may receive an image of ingredients 910, a recipe 920, and a final food product image 930 produced by the recipe 920.

In this connection, the image of the ingredients 910 may be an image capturing raw materials before the cooking in the cooking device. For example, when a chicken is made, the image of the ingredients 910 may include a raw chicken.

Further, the recipe 920 may include at least one of a method for cooking ingredients included in the image of the ingredients 910 and control information of a cooking device cooking the ingredients.

Further, the final food product image 930 produced by the recipe 920 may mean an image of the food finished when the ingredients included in the image of the ingredients 910 is cooked using a method described in the recipe 920.

The processor may receive, in various manner, the image of the ingredients 910, the recipe 920, and the final food product image 930 produced by the recipe 920.

An example of an electronic device of a first user will be described.

Referring to FIG. 9, the electronic device of the first user may be a first artificial intelligence cooking device 700.

Further, a processor of the first artificial intelligence cooking device 700 may capture the image 910 of the ingredients using a camera.

For example, when the first artificial intelligence cooking device 700 is an oven, the camera of the first artificial intelligence cooking device 700 may capture a front of the first artificial intelligence cooking device 700 or a cooking chamber of the first artificial intelligence cooking device 700.

The processor of the first artificial intelligence cooking device 700 may capture the image 910 of the ingredients and the final food product image 930 produced by the recipe 920, and transmit the captured images to the artificial intelligence server 100.

Further, the processor of the first artificial intelligence cooking device 700 may perform the cooking based on the control information. In this connection, the control information may be information about an operation of the first artificial intelligence cooking device 700 set to perform the cooking. For example, when the first artificial intelligence cooking device 700 is the oven, the control information may be at least one of cooking temperature or cooking time.

Further, the control information may be directly input by the user to the first artificial intelligence cooking device 700, and may be automatically set by the first artificial intelligence cooking device 700 based on the image of the ingredients.

In an example, the processor of the first artificial intelligence cooking device 700 may transmit the recipe including the control information to the artificial intelligence server 100.

Further, referring to FIG. 10, the electronic device of the first user may be a first mobile terminal 710.

A processor of the first mobile terminal 710 may capture an image of ingredients using a camera. For example, the user may capture the image of the ingredients using the first mobile terminal 710.

Further, the processor of the first mobile terminal 710 may capture a final food product image using the camera. For example, when cooking is finished, the user may capture the final food product image using the first mobile terminal 710.

In an example, the first mobile terminal 710 may receive an input of control information from the user. When the control information is received by the first mobile terminal 710, the processor of the first mobile terminal 710 may transmit the control information to the first artificial intelligence cooking device 700 directly or via a server. In this case, the first artificial intelligence cooking device 700 may perform the cooking based on the received control information.

In an example, the processor of the first mobile terminal 710 may transmit a recipe including control information to the artificial intelligence server 700.

Further, the recipe may further include a cooking method input by the user. In this connection, the cooking method, unlike the control information described above, may mean a behavior of the user in a cooking process. For example, the cooking method may be "flipping over ingredients 20 minutes after start of the cooking".

In an example, the first electronic device (the first mobile terminal 710 or the first artificial intelligence cooking device 700) may receive an input of the cooking method via the input unit. Further, the first electronic device may transmit the recipe including the control information and the cooking method to the artificial intelligence server.

In an example, a processor of the artificial intelligence server 100 may store the received image of the ingredients, recipe, and final food product image produced by the recipe in a memory.

In an example, the electronic device may transmit, to the artificial intelligence server 100, additional information together with the image of the ingredients, the recipe, and the final food product image produced by the recipe.

In this connection, the additional information may include at least one of a food name, a type of the artificial intelligence cooking device, a model name of the artificial intelligence cooking device, ingredients, a food category, the number of ingredients, or an amount of ingredients.

In this connection, the food name may mean a name of a final food produced by the recipe.

Further, the type of the artificial intelligence cooking device is a category of cooking device based on a classification criterion. For example, the type of the artificial intelligence cooking device may include an oven, a gas stove, an electric stove, and the like.

Further, the food category is a category of the food based on a classification criterion. For example, the food category may be a steamed food, a fried food, a roasted food, a fermented food, and the like.

Further, the ingredients may be a chicken, an onion, a potato, dough, various seasonings, and the like.

Further, the number of ingredients may mean the number of potatoes, the number of carrots, and the like.

Further, the amount of ingredients may mean a size of the chicken or the like.

In an example, the processor of the artificial intelligence server 100 may receive the additional information from the plurality of electronic devices and store the received additional information in the memory.

For example, the processor of the artificial intelligence server 100 may receive at least one of the type or the model name of the cooking device from the first electronic device (the first artificial intelligence cooking device 700 or the first mobile terminal 710) and store the received at least one of the type or the model name of the cooking device in the memory.

FIG. 11 is a diagram for illustrating a database according to an embodiment of the present invention.

The processor of the artificial intelligence server 100 may receive the image of the ingredients, the recipe, the final food product image, and the additional information from the electronic devices of the various users and generate a database using the received data.

The database may include a first data set a, a second data set b, and a third data set c.

In this connection, the first data set a may include a first recipe and information related to the first recipe.

For example, the first data set a may include a first image of ingredients, the recipe including control information and a cooking method for cooking ingredients in the first image of the ingredients, and a first final food image produced by the first recipe.

In addition, the first data set a may include the additional information such as first ingredients, a type of the cooking device, a model name of the cooking device, a food category, a food name, and the like.

Further, the first data set a may include a popularity of the first recipe.

Specifically, the processor of the artificial intelligence server 100 may obtain the popularity of the first recipe based on the number of downloads of the first recipe or satisfaction levels with the first recipe provided by a plurality of users.

Further, the first data set a may include the number of registrations of recipes corresponding to a food name for each user.

In this connection, the number of recipes registered corresponding to the food name for each user may be the total number of recipes registered by the same user for the same food.

For example, when the first user registers four recipes for steamed chicken, the total number of recipes registered by the first user for the steamed chicken may be four.

In an example, the food name may be received from the electronic device, but is not limited thereto. The processor of the artificial intelligence server may obtain the food name using the final food product image received from the electronic device.

Specifically, the processor of the artificial intelligence server may obtain the food name corresponding to the first recipe by performing object recognition on the final food image produced using the first recipe.

Further, names of the ingredients may be received from the electronic device, but are not limited thereto. The processor of the artificial intelligence server may obtain the names of the ingredients using the image of the ingredients received from the electronic device.

Specifically, the processor of the artificial intelligence server may obtain the names of the ingredients, the amount of the ingredients, the number of ingredients, and the like by performing the object recognition on the received image of the ingredients.

FIG. 12 is a diagram for illustrating a method for training an artificial intelligence model according to an embodiment of the present invention.

First, the artificial intelligence will be briefly described.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

A structure of the artificial neural network may be specified by a model composition, an activation function, a loss function or cost function, a learning algorithm, an optimization algorithm, or the like, a hyperparameter may be preset before learning, and then a model parameter is set through the learning to specify a model.

For example, elements for determining the structure of the artificial neural network may include the number of hidden layers, the number of hidden nodes included in each hidden layer, an input feature vector, a target feature vector, and the like.

The hyperparameter includes various parameters that must be set initially for the learning, such as an initial value or the like of the model parameter. In addition, the model parameter includes various parameters to be determined through the learning.

For example, the hyperparameter may include an initial weight value between nodes, an initial bias value between nodes, a mini-batch size, the number of the learning repetitions, a learning rate, or the like. In addition, the model parameter may include a weight value between nodes and a bias value between nodes.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In this case, the step size may mean the learning rate.

The gradient descent scheme may obtain a slope by partial-differentiate the loss function with each model parameter, and may change the model parameters by the learning rate in an obtained gradient direction to update the model parameters.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

In an example, the artificial intelligence model according to an embodiment of the present invention may be a neural network trained using the image of the ingredients received from the plurality of electronic devices and the names of the final foods produced using the ingredients.

Further, the artificial intelligence model may be mounted on the artificial intelligence server.

Specifically, the artificial intelligence model may be implemented in hardware, software, or a combination of the hardware and the software. Further, when a portion or an entirety of the artificial intelligence model is implemented in the software, at least one instruction that configures the artificial intelligence model may be stored in the memory of the artificial intelligence cooking device.

First, a method for training a neural network to predict a food name of a final food produced using an image of ingredients with reference to FIG. 12a.

The processor of the artificial intelligence server 200 may label, on training data including an image of ingredients 1210, a food name 1230 of a final food produced using at least one ingredient included in the image of the ingredients.

That is, the processor of the artificial intelligence server 200 may train an artificial intelligence model 1110 using the image of the ingredients as an input value and the food name of the final food as an output value.

In this case, the neural network may use the image of the ingredients and the food name of the final food to infer a function of an association relationship between the image of the ingredients and the final food. Parameters (weight, bias, or the like) of the neural network may be determined (optimized) through the function inferred by the neural network.

Further, such training may be repeatedly performed using data received from the plurality of electronic devices.

In an example, the artificial intelligence server may extract the food name of the final food from the final food product image and use the extracted food name of the final food for training the artificial intelligence model. It is assumed that the training is performed using data received from the first electronic device among the plurality of electronic devices.

The processor of the artificial intelligence server may receive the first image of the ingredients and the first final food product image produced using the first ingredients from the first electronic device among the plurality of electronic devices.

In this case, the processor may obtain a first food name of a final food produced using the first ingredients, using the first final food product image.

Specifically, the processor of the artificial intelligence server may obtain the first food name of the final food produced using the first ingredients by performing object recognition on the first final food product image.

In this case, the processor may train the artificial intelligence model by labeling the first food name on the first image of the ingredients.

In an example, it is described that the image of the ingredients is used as the training data, but is not limited thereto. The names of the ingredients may be used as the training data.

Specifically, referring to FIG. 12b, the processor of the artificial intelligence server 200 may train the artificial intelligence model 1110 by labeling, on the training data including the names 1220 of the ingredients, the food name 1230 of the final food using the ingredients.

In this case, the neural network may infer a function of an association relationship between the image of the ingredients and the final food using the names 1220 of the ingredients and the food name 1230 of the final food. Further, the parameters (weight, bias, or the like) of the neural network may be determined (optimized) through the function inferred by the neural network.

Figure 13:
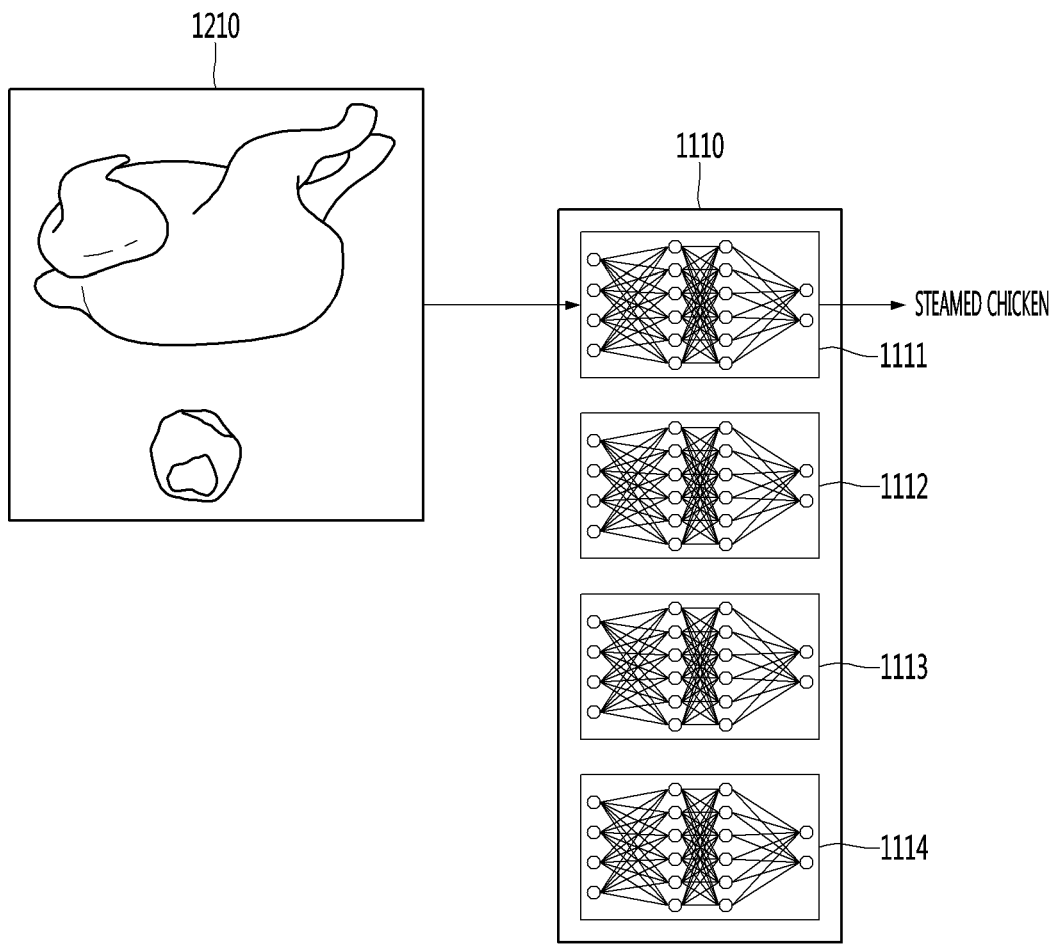
FIG. 13 is a diagram for illustrating a method for training artificial intelligence models classified based on various food categories, according to an embodiment of the present invention.

FIG. 13 is a diagram for illustrating a method for training artificial intelligence models classified based on various food categories, according to an embodiment of the present invention.

The artificial intelligence model 1110 may include a plurality of artificial intelligence models 1111, 1112, 1113, and 1114 respectively corresponding to a plurality of food categories.

For example, the artificial intelligence model 1110 may include a first artificial intelligence model 1111 corresponding to a first food category (a steamed food), a second artificial intelligence model 1112 corresponding to a second food category (a grilled food), a third artificial intelligence model 1113 corresponding to a third food category (a fried food), and a fourth artificial intelligence model 1114 corresponding to a fourth food category (a fermented food).

In an example, the processor may label the first food name on the first image of the ingredients 1210 to train the artificial intelligence model corresponding to a food category to which the first food name belongs.

Specifically, the processor may obtain information about the food category to which the first food name belongs using the first food name. For example, when the first food name is a steamed chicken, the processor may determine that the food category to which the first food name belongs is the steamed food.

In this case, the processor may label the first food name on the first image of the ingredients 1210 to train the first artificial intelligence model 1111 corresponding to the food category to which the first food name belongs.

In an example, in FIGS. 9 to 13, the registration process of the recipe was illustrated. Further, a recommendation process of a recipe will be illustrated in FIGS. 14 to 19.

Figure 14:
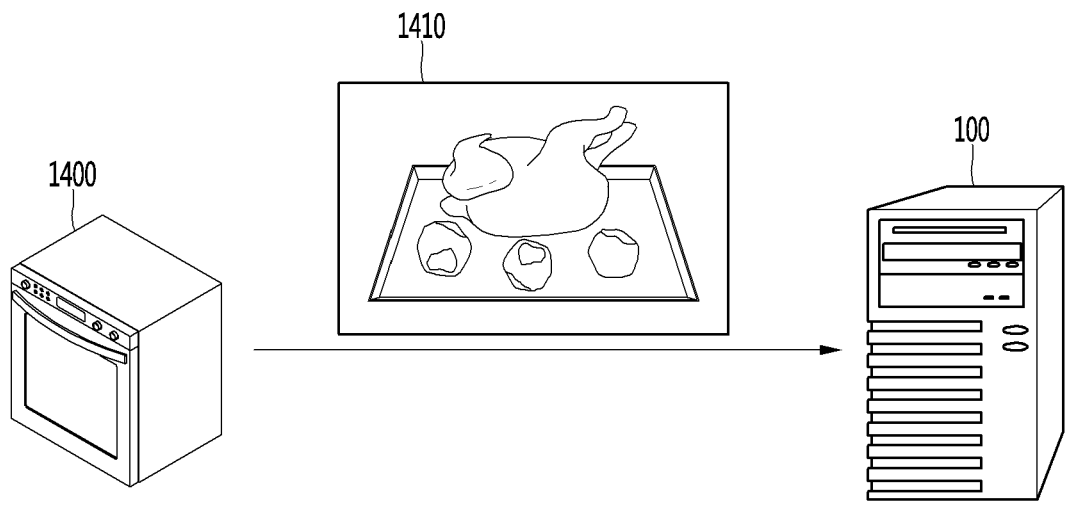
FIGS. 14 to 15 are diagrams for illustrating a method for obtaining a food name using an image of ingredients, according to an embodiment of the present invention.
Figure 15:
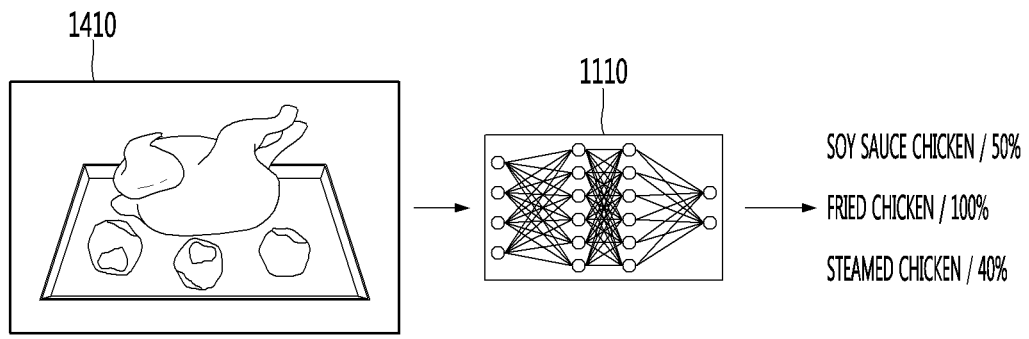

FIGS. 14 to 15 are diagrams for illustrating a method for obtaining a food name using an image of ingredients, according to an embodiment of the present invention.

It is assumed that a first electronic device 1400 among a plurality of electronic devices requests a recipe.

The processor of the artificial intelligence server 100 may receive an image of ingredients 1410 from the first electronic device 1400.

Specifically, a user of the first electronic device 1400 may capture ingredients and transmit the captured image of the ingredients to a server.

Further, when the first electronic device 1400 is an artificial intelligence cooking device, a processor may receive an image of ingredients 1410 captured by the artificial intelligence cooking device from the artificial intelligence cooking device.

Further, when the first electronic device 1400 is a mobile terminal, the processor may receive the image of the ingredients 1410 captured by the mobile terminal from the mobile terminal.

Then, a processor of the artificial intelligence server 100 may provide the received image of the ingredients to the artificial intelligence model to obtain a food name corresponding to the image of the ingredients.

Specifically, referring to FIG. 15, the processor of the artificial intelligence server 100 may input the image of the ingredients 1410 into the artificial intelligence model 1110. In this connection, the artificial intelligence model 1110 may be a neural network trained by labeling a food name of a final food on the image of the ingredients. In this case, the artificial intelligence model may output a result value, specifically, the food name of the final food.

In this case, the processor of the artificial intelligence server may transmit a recipe corresponding to the output food name to the first electronic device.

In an example, the processor may transmit a plurality of recipes to the electronic devices based on the result value output from the artificial intelligence model.

Specifically, the processor may obtain a plurality of food names by providing the image of the ingredients to the artificial intelligence model 1110.

More specifically, when the image of the ingredients is input, the artificial intelligence model 11110 may output the result value.

In this connection, the result value may include a plurality of food names and a plurality of reliability scores respectively corresponding to the plurality of food names.

For example, the artificial intelligence model 1110 may output a result value including a first food name (soy sauce chicken) and a reliability score (50%) of the first food name, a second food name (fried chicken) and a reliability score (10%) of the second food name, and a third food name (steamed chicken) and a reliability score (40%) of the third food name.

In this case, the processor may obtain at least one food name having a reliability score equal to or above a predetermined value. For example, the processor may obtain the soy sauce chicken and the steamed chicken respectively having reliability scores equal to or above 30%.

In this case, the processor may transmit, to the electronic device, at least one recipe corresponding to the obtained at least one food name. In this case, at least one recipe may be recommended for the user.

Figure 16:
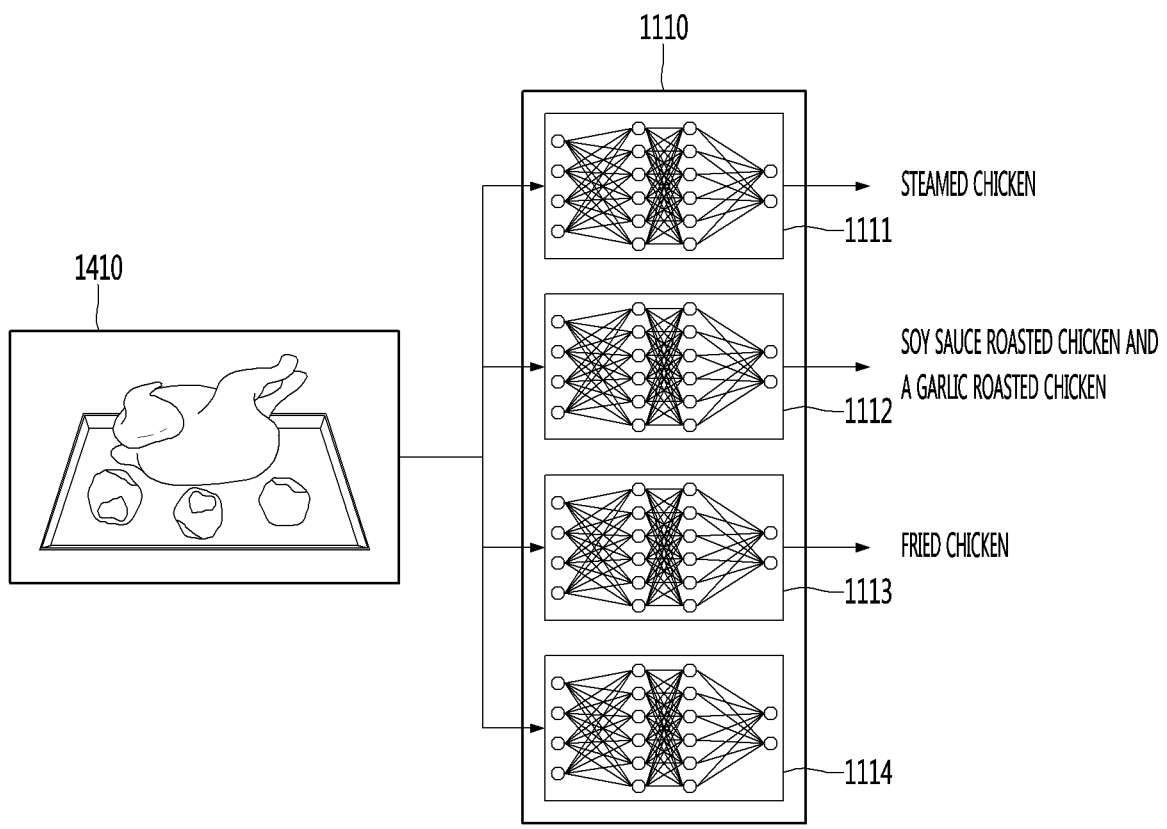
FIG. 16 illustrates a method for providing recipes of foods belonging to various food categories to a user, according to an embodiment of the present invention.

FIG. 16 illustrates a method for providing recipes of foods belonging to various food categories to a user, according to an embodiment of the present invention.

The artificial intelligence model 1110 may include a plurality of artificial intelligence models 1111, 1112, 1113, and 1114 respectively corresponding to a plurality of food categories.

In addition, the processor of the artificial intelligence server 100 may provide images of ingredients to the plurality of artificial intelligence models 1111, 1112, 1113, and 1114 respectively corresponding to the plurality of food categories to obtain a plurality of food names belonging to the plurality of food categories.

For example, the first artificial intelligence model 1111 corresponding to the steamed food may output a steamed chicken as a result value. In another example, the second artificial intelligence model 1112 corresponding to the roasted food may output a soy sauce roasted chicken and a garlic roasted chicken respectively having reliability scores equal to or above a predetermined value. In another example, the third artificial intelligence model 1113 corresponding to the fried food may output a fried chicken as a result value. In another example, the fourth artificial intelligence model 1114 corresponding to the fermented food may not output a food name having a reliability level equal to or above a predetermined value.

Further, the processor of the artificial intelligence server may transmit recipes corresponding to the obtained plurality of food names to the electronic device. In this case, various recipes belonging to various food categories may be recommended for the user.

In an example, the processor of the artificial intelligence server may receive food category information together with the image of the ingredients from the first electronic device 1400.

Specifically, the user of the first electronic device 1400 may capture the image of the ingredients, input desired food category information, and then transmit the image of the ingredients and the food category information to the artificial intelligence server.

In an example, the image of the ingredients and the food category information are received, the processor of the artificial intelligence server may provide the image of the ingredients to an artificial intelligence model corresponding to the food category information to obtain at least one recipe corresponding to the food category information.

For example, when the received food category is the roasted food, the processor of the artificial intelligence server may input the image of the ingredients into the second artificial intelligence model 1112 corresponding to the second food category (roasted cooking). In this case, the second artificial intelligence model 1112 may output at least one food name belonging to the second food category (roasted food). The processor may transmit at least one recipe corresponding to the at least one output food name to the electronic device.

In one example, the processor may select a recipe among a plurality of recipes corresponding to a food name and transmit the selected recipe to the electronic device based on at least one of a popularity of the number of registrations of a recipe corresponding to a food name for each user.

Specifically, the processor may select a predetermined number of recipes having the highest popularities among a plurality of recipes corresponding to a food name and transmit the selected predetermined number of recipes to the electronic device.

Specifically, the processor may select a predetermined number of recipes having the highest popularity among a plurality of recipes corresponding to a food name and transmit the selected predetermined number of recipes to the electronic device.

Further, the processor may select a predetermined number of recipes having the highest number of registrations and transmit the selected predetermined number of recipes to the electronic device.

In an example, the processor of the artificial intelligence server may select a recipe to be transmitted to the electronic device among a plurality of recipes corresponding to a food name based on a type of the cooking device by which the ingredients are to be cooked.

Specifically, information about a type of the first electronic device 1400 may be stored in a memory or may be received from the first electronic device 1400.

In this case, the processor of the artificial intelligence server may select a recipe to be transmitted to the first electronic device from among a plurality of recipes corresponding to a food name based on the type of the first electronic device 1400 by which the ingredients are to be cooked.

In an example, the processor of the artificial intelligence server may select the recipe to be transmitted to the electronic device from among the plurality of recipes corresponding to the food name based on the type and model information of the cooking device by which the ingredients are to be cooked.

Specifically, the type information and the model information of the first electronic device 1400 may be stored in the memory or may be received from the first electronic device 1400.

In this case, the processor of the artificial intelligence server may select a recipe to be transmitted to the first electronic device among the plurality of recipes corresponding to the food name based on the type and model information of the first electronic device 1400 by which the ingredients are to be cooked.

For example, when the first electronic device 1400 is an oven of a model name MLB2501 and a food name is a cookie, the processor may select a recipe in which cooking is performed in the oven of the model name MLB2501 among a plurality of recipes corresponding to the cookie.

In an example, the processor of the artificial intelligence server may select a recipe to be transmitted to the electronic device among the plurality of recipes corresponding to the food name based on the type and specification information of the cooking device by which the ingredients are to be cooked.

Specifically, the type and specification information of the first electronic device 1400 may be stored in the memory or may be received from the first electronic device 1400.

In this case, the processor of the artificial intelligence server may select a recipe to be transmitted to the first electronic device among the plurality of recipes corresponding to the food name based on the type and specification information of the first electronic device 1400 by which the ingredients are to be cooked.

For example, when the first electronic device 1400 is a microwave oven with an output of 700 W and the food name is the cookie, the processor may select a recipe in which cooking is performed in the microwave oven of 700 W among the plurality of recipes corresponding to the cookie.

In an example, the processor of the artificial intelligence server may transmit, to the electronic device 1400, together with the recipe, 'the image of the ingredients, the final food product image, the additional information, the popularity of the recipe, the number of registrations of the recipe, and the like' corresponding to the recipe.

Figure 17:
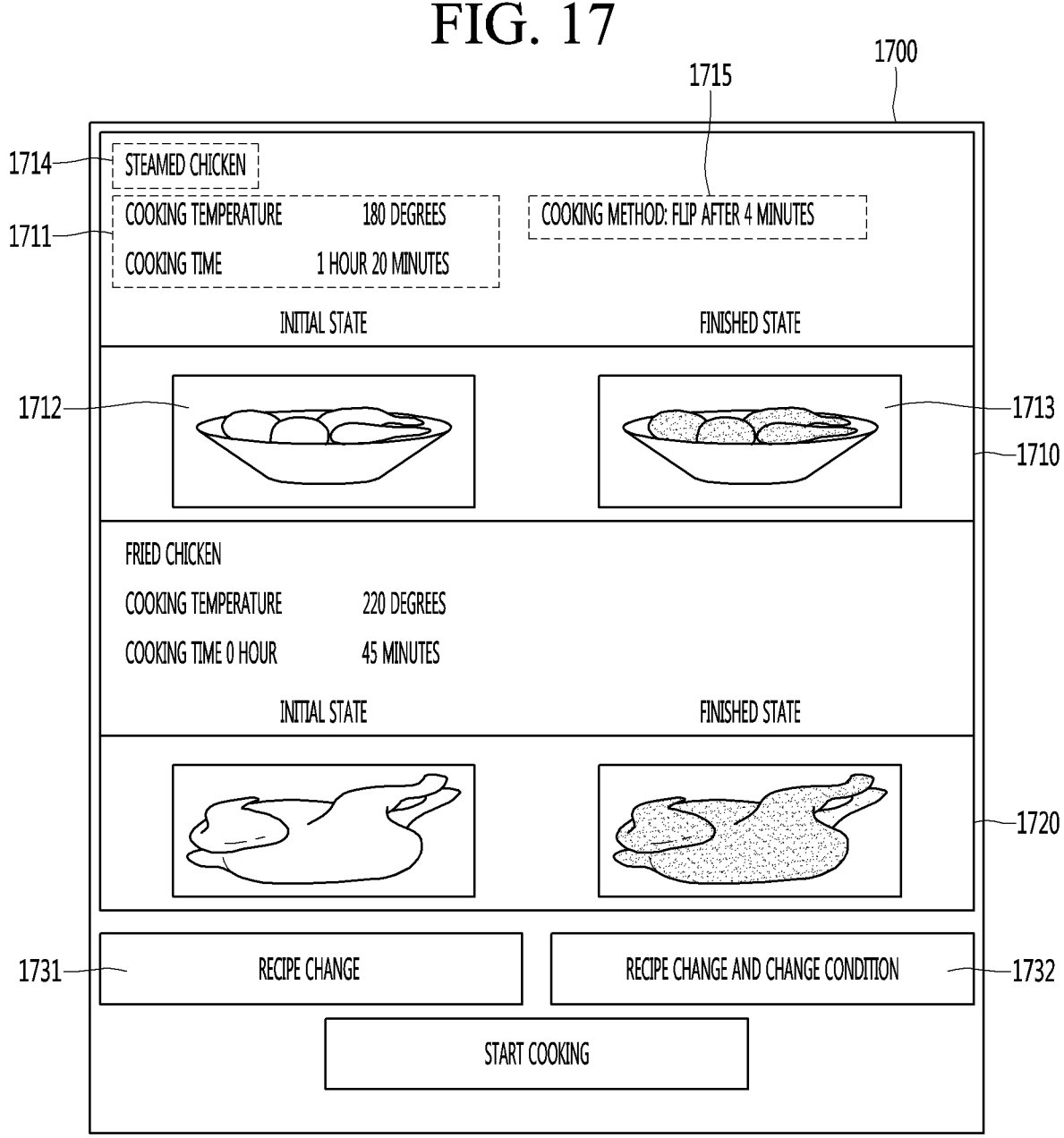
FIG. 17 illustrates a recipe displayed on a first electronic device 1400 according to an embodiment of the present invention.

FIG. 17 illustrates a recipe displayed on a first electronic device 1400 according to an embodiment of the present invention.

The processor of the first electronic device 1400 may control a display 1700 to display a received recipe.

In this connection, a recipe 1710 may include at least one of control information 1711 of a cooking device or a cooking method 1715 input by the user.

Further, the processor of the first electronic device 1400 may display recipe-related information received with the recipe 1710.

For example, the processor of the first electronic device 1400 may display an image 1712 of ingredients corresponding to the recipe and a final food product image 1713 corresponding to the recipe.

Further, the processor of the first electronic device 1400 may display a food name 1714, a type of the artificial intelligence cooking device, a model name of the artificial intelligence cooking device, ingredients, a food category, additional information of the number of ingredients or an amount of the ingredients, a popularity of the recipe, the number of registrations of the recipe, and the like.

Further, when a plurality of recipes are received, the processor of the first electronic device 1400 may display a plurality of recipes 1710 and 1720 together with the recipe-related information.

In an example, after transmitting, together with the recipe, the final food product image produced by the recipe, the processor of the artificial intelligence server may receive a recipe change request from the first electronic device.

Specifically, a user who watched the final food product image may select a recipe change button 1731 to request a change of the recipe. In this case, the first electronic device may transmit the recipe change request to the artificial intelligence server.

In an example, when the recipe change request is received from the first electronic device, the processor of the artificial intelligence server may transmit a recipe other than the recipe to the electronic device.

In an example, after transmitting the final food product image produced by the recipe together with the recipe, the processor of the artificial intelligence server may receive the recipe change request and a recipe change condition from the first electronic device.

Specifically, the user who watched the final food product image may select a recipe change and change condition button 1732 to request the recipe change and to input the recipe change condition together.

Figure 18:
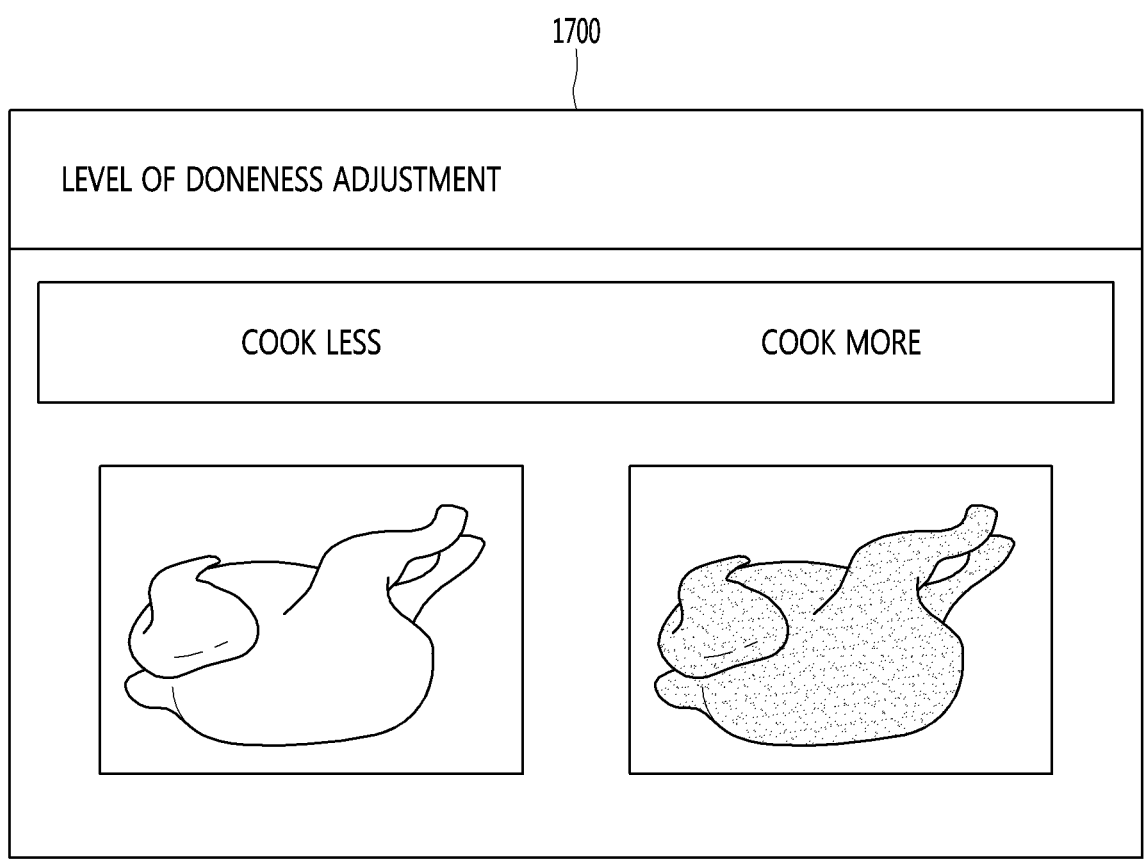
FIG. 18 illustrates a recipe change condition.

FIG. 18 illustrates a recipe change condition.

Referring to FIG. 18, the user who watched the final food product image may input the recipe change condition that indicates a level of doneness.

In this case, the first electronic device may transmit the recipe change request and the recipe change condition to the artificial intelligence server.

In an example, when the recipe change request is received from the first electronic device, the processor of the artificial intelligence server may transmit another recipe corresponding to the recipe change condition to the first electronic device.

Specifically, the processor may search for a recipe with a final food product image corresponding to the recipe change condition among a plurality of recipes corresponding to a food name and transmit the searched recipe to the first electronic device.

For example, when the user selects to cook more, the processor may search for a recipe with a final food product image having a dark color and transmit the searched recipe to the first electronic device.

Figure 19:
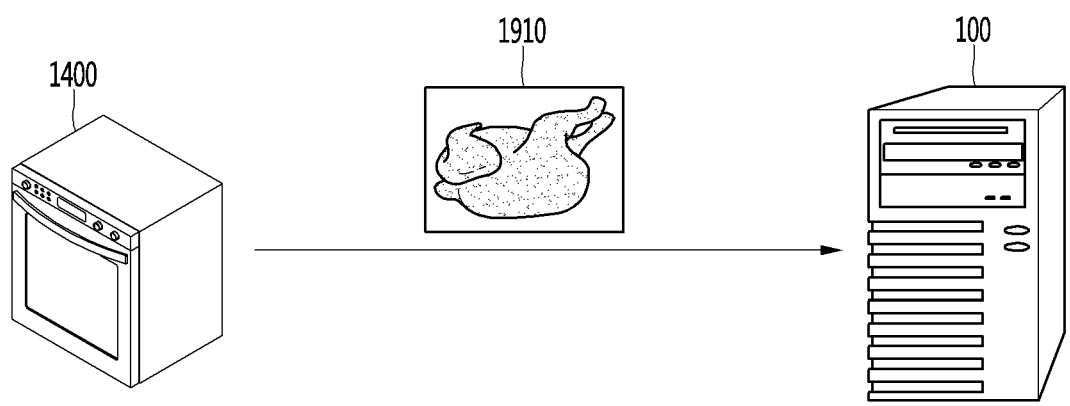
FIG. 19 illustrates a method for transmitting an operation stop command when cooking is finished according to an embodiment of the present invention.

FIG. 19 illustrates a method for transmitting an operation stop command when cooking is finished according to an embodiment of the present invention.

Even when the same recipe is used, a completion time of cooking may vary depending on a cooking environment (ingredient thawed state, specification of a cooking device).

For example, when a recipe uses a refrigerated chicken but the user of the first electronic device 1400 uses a frozen chicken is used, even though cooking is performed based on the recipe by the first electronic device 1400, a food may not be finished.

In another example, when a recipe uses the frozen chicken but the user of the first electronic device 1400 uses the refrigerated chicken, when cooking is performed by the first electronic device 1400 based on the recipe, ingredients may be burned.

Accordingly, the first electronic device 1400 may stop an operation when an operation command is received from the artificial intelligence server.

Specifically, the processor of the first electronic device 1400 may capture ingredients being cooked and transmit an image 1910 of the ingredients being cooked to the artificial intelligence server.

In this case, the processor of the artificial intelligence server 100 may receive the image 1910 of the ingredients being cooked from the first electronic device 1400 by which the ingredients are being cooked and may determine whether the image of the ingredients being cooked corresponds to a final food product image produced by the recipe.

For example, when a shape, a form, a color, or the like of the image of the ingredients 1910 is similar to a shape, a form, a color, or the like of the final food product image produced by the recipe, the processor of the artificial intelligence server 100 may determine that the cooking is finished.

Further, when the image of the ingredients being cooked corresponds to the final food product image produced by the recipe, that is, when it is determined that the cooking is finished, the processor of the artificial intelligence server may transmit an operation stop command to the first electronic device 1400. In addition, the first electronic device 1400 that received the operation stop command may stop the cooking.

Figure 20:
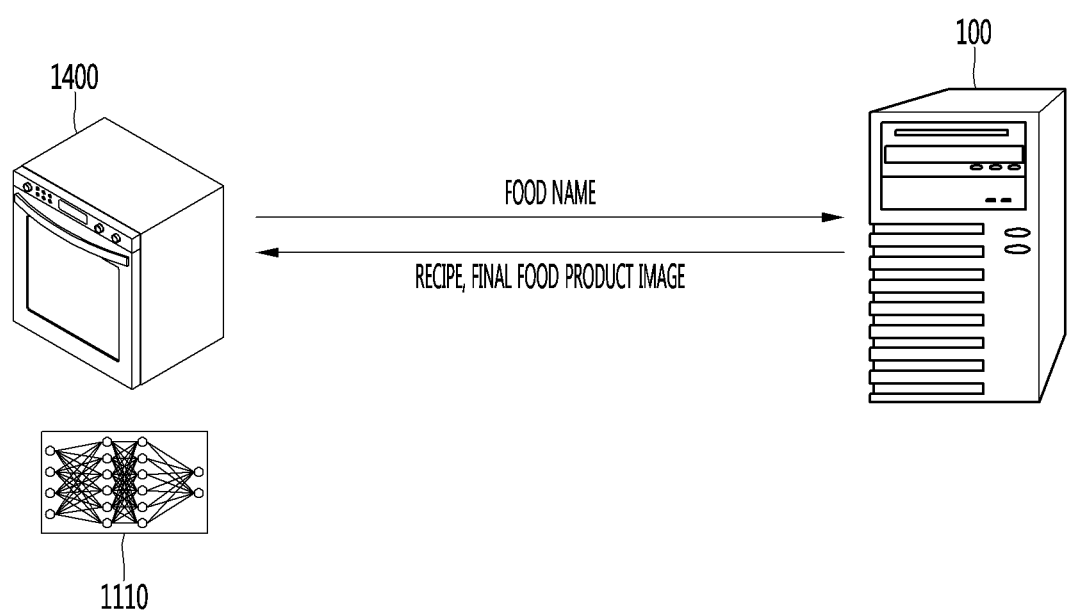
FIG. 20 is a diagram for illustrating an operation when an artificial intelligence model is mounted on a first artificial intelligence cooking device, according to an embodiment of the present invention.

FIG. 20 is a diagram for illustrating an operation when an artificial intelligence model is mounted on a first artificial intelligence cooking device, according to an embodiment of the present invention.

Only differences from the case in which the artificial intelligence model is mounted on the artificial intelligence server 100 will be described.

The processor of the first artificial intelligence cooking device 1400 may capture the ingredients using the camera to obtain the image of the ingredients.

Then, the processor of the first artificial intelligence cooking device 1400 may provide the captured image of the ingredients to the artificial intelligence model to obtain the food name corresponding to the image of the ingredients.

In this case, the processor of the first artificial intelligence cooking device 1400 may transmit the obtained food name to the artificial intelligence server 100.

In an example, the processor of the artificial intelligence server 100 may receive the food name and transmit at least one recipe corresponding to the received food name to the first artificial intelligence cooking device 1400.

In this case, the processor of the first artificial intelligence cooking device 1400 may receive the recipe corresponding to the food name and perform cooking based on the received recipe.

In an example, the processor of the first artificial intelligence cooking device 1400 may receive the final food product image produced by the recipe together with the recipe.

In addition, the processor of the first artificial intelligence cooking device 1400 may capture the ingredients being cooked to obtain an image of the ingredients being cooked.

Further, when the image of the ingredients being cooked corresponds to the final food product image produced by the recipe, the processor of the first artificial intelligence cooking device 1400 may control the heating portion to stop the cooking.

The present invention described above may be implemented as a computer-readable code in a medium where a program is recorded. A computer-readable medium includes all kinds of recording devices that store data that may be read by a computer system. Examples of the computer-readable medium may include hard disk drive (HDD), solid state drive (SSD), silicon disk drive (SDD), read-only memory (ROM), random access memory (RAM), CD-ROM, a magnetic tape, a floppy disk, an optical data storage device, and the like. Further, the computer may include a controller 180 of the terminal. Accordingly, the detailed description should not be construed as being limited in all respects but should be considered as illustrative. The scope of the present invention should be determined by reasonable interpretation of the appended claims, and all changes within the equivalent scope of the present invention are included in the scope of the present invention.

What is claimed is:

1. An artificial intelligence server comprising:
   a communicator in communication with an electronic device;
   a memory for storing data; and
   a processor configured to:
      receive an ingredient image from the electronic device;
      provide the ingredient image to an artificial intelligence model to obtain a food name corresponding to the ingredient image; and
      transmit a recipe corresponding to the food name to the electronic device,
   wherein the communicator is in communication with a plurality of electronic devices,
   wherein the artificial intelligence model is a neural network trained using images of ingredients and food names of final foods produced using the ingredients received from the plurality of electronic devices, and
   wherein the processor is configured to:
      receive an image of first ingredients and a first final food product image produced using the first ingredients from a first electronic device among the plurality of electronic devices;
      obtain a first food name of a food produced using the first ingredients, using the first final food product image; and
      label the first food name on the image of the first ingredients to train the artificial intelligence model.

2. The artificial intelligence server of claim 1, wherein the processor is configured to:
   provide the ingredient image to the artificial intelligence model to obtain a plurality of food names; and
   transmit a plurality of recipes corresponding to the plurality of food names to the electronic device.

3. The artificial intelligence server of claim 2, wherein the artificial intelligence model includes a plurality of artificial intelligence models respectively corresponding to a plurality of food categories,
   wherein the processor is configured to:
      provide the ingredient image to the artificial intelligence model to obtain the plurality of food names; and
      transmit the plurality of recipes corresponding to the plurality of food names to the electronic device.

4. The artificial intelligence server of claim 1, wherein the artificial intelligence model includes a plurality of artificial intelligence models respectively corresponding to a plurality of food categories,
   wherein the processor is configured to:
      receive food category information together with the ingredient image;
      provide the ingredient image to an artificial intelligence model corresponding to the food category information to obtain at least one recipe corresponding to the food category information; and
      transmit the at least one recipe corresponding to the food category information to the electronic device.

5. The artificial intelligence server of claim 1, wherein the processor is configured to select a recipe to be transmitted to the electronic device among a plurality of recipes corresponding to the food name based on at least one of a popularity or a number of registrations of a recipe corresponding to the food name of each user.

6. The artificial intelligence server of claim 1, wherein the processor is configured to:
   select a recipe to be transmitted to the electronic device among a plurality of recipes corresponding to the food name based on a type of a cooking device by which the ingredients are to be cooked; or
   select a recipe to be transmitted to the electronic device among the plurality of recipes corresponding to the food name based on the type of the cooking device by which the ingredients are to be cooked and model information of the cooking device.

7. The artificial intelligence server of claim 1, wherein the recipe includes at least one of control information of a cooking device or a cooking scheme input by a user.

8. The artificial intelligence server of claim 7, wherein the processor is configured to:
   transmit a final food product image produced by the recipe together with the recipe; and
   when a recipe change request is received from the electronic device, transmit a recipe different from the transmitted recipe.

9. The artificial intelligence server of claim 8, wherein the processor is configured to:
   when a recipe change condition is received together with the recipe change request, transmit another recipe corresponding to the recipe change condition to the electronic device.

10. The artificial intelligence server of claim 1, wherein the processor is configured to:
    receive, from a cooking device by which the ingredients are cooked, an image of the ingredients being cooked; and
    transmit an operation stop command when the image of the ingredients being cooked corresponds to a final food product image produced by the recipe.

11. The artificial intelligence server of claim 1,
    wherein the processor is configured to receive ingredient images, recipes, and final food product images produced by the recipes from the plurality of electronic devices and store the received ingredient images, recipes, and final food product images in the memory.

12. The artificial intelligence server of claim 1, wherein the artificial intelligence model includes a plurality of artificial intelligence models respectively corresponding to a plurality of food categories,
    wherein the processor labels the first food name on the image of the first ingredients to train an artificial intelligence model corresponding to a food category to which the first food name belongs.

13. The artificial intelligence server of claim 11, wherein the processor is configured to receive at least one of a type or a model name of a cooking device from the plurality of electronic devices and store the received at least one of the type or the model name of the cooking device in the memory.

* * * * *